(12) United States Patent
Hamamoto et al.

(10) Patent No.: US 11,274,616 B2
(45) Date of Patent: Mar. 15, 2022

(54) CONTROL METHOD AND CONTROL DEVICE FOR INTERNAL COMBUSTION ENGINE

(71) Applicants: NISSAN MOTOR CO., LTD., Yokohama (JP); RENAULT S. A. S., Boulogne-Billancourt (FR)

(72) Inventors: Takayuki Hamamoto, Kanagawa (JP); Daisuke Suzuki, Kanagawa (JP); Kengo Yonekura, Kanagawa (JP); Kenji Yasaka, Kanagawa (JP)

(73) Assignees: NISSAN MOTOR CO., LTD., Yokohama (JP); RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 16/331,283

(22) PCT Filed: Sep. 9, 2016

(86) PCT No.: PCT/JP2016/076568
§ 371 (c)(1),
(2) Date: Mar. 7, 2019

(87) PCT Pub. No.: WO2018/047286
PCT Pub. Date: Mar. 15, 2018

(65) Prior Publication Data
US 2019/0195152 A1 Jun. 27, 2019

(51) Int. Cl.
*F02D 41/00* (2006.01)
*F02M 35/12* (2006.01)
(Continued)

(52) U.S. Cl.
CPC .......... *F02D 41/0052* (2013.01); *F02B 37/18* (2013.01); *F02D 41/0007* (2013.01);
(Continued)

(58) Field of Classification Search
CPC ........ F02M 26/64; F02M 26/06; F02M 26/10; F02M 35/1222; F02D 2009/0272;
(Continued)

(56) References Cited

U.S. PATENT DOCUMENTS 4,094,285 A * 6/1978 Oyama .................. F02M 9/106
123/568.17
4,388,912 A * 6/1983 Kimura .................. F02D 37/00
123/568.27

(Continued)

FOREIGN PATENT DOCUMENTS

EP   1 116 870 A2   7/2001
EP      2128407 B1 *  2/2012   ............. F02M 26/06
(Continued)

OTHER PUBLICATIONS

Motorera Dictionary of Automotive Terms—'Id', <https://www.motorera.com/dictionary/id.htm> Accessed: Mar. 24, 2020. (Year: 2020).*

*Primary Examiner* — Logan M Kraft
*Assistant Examiner* — Joshua Campbell
(74) *Attorney, Agent, or Firm* — Foley & Lardner LLP

(57) ABSTRACT

A negative pressure control valve (44) is disposed in a part of an intake passage (12) upstream of a confluence (30) of an EGR passage (27) and the intake passage (12). When in an EGR region (Regr) where an EGR gas is recirculated to the intake passage (12) through the EGR passage (27), the negative pressure control valve (44) is controlled in a manner to ensure a differential pressure between an exhaust passage (13) and the intake passage (12). When in an operation region (R2) lower in load than the EGR region (Regr), the negative pressure control valve (44) is controlled in a closing direction so as to suppress occurrence of noise.

10 Claims, 3 Drawing Sheets

(51) Int. Cl.
  *F02M 26/64* (2016.01)
  *F02M 26/10* (2016.01)
  *F02B 37/18* (2006.01)
  *F02D 41/14* (2006.01)

(52) U.S. Cl.
  CPC ....... *F02D 41/0065* (2013.01); *F02D 41/144* (2013.01); *F02D 41/1441* (2013.01); *F02M 26/10* (2016.02); *F02M 26/64* (2016.02); *F02M 35/1222* (2013.01); *F02D 2041/0017* (2013.01); *F02D 2200/0406* (2013.01); *F02D 2250/41* (2013.01)

(58) Field of Classification Search
  CPC ........... F02D 2041/0017; F02D 41/144; F02D 41/1441; F02D 41/0065; F02D 41/0052; F02B 37/18
  See application file for complete search history.

(56) References Cited

U.S. PATENT DOCUMENTS

| | | | | |
|---|---|---|---|---|
| 4,466,416 A | * | 8/1984 | Kawamura | F02M 26/57 123/378 |
| 4,723,527 A | * | 2/1988 | Panten | F02D 41/0002 123/556 |
| 5,054,460 A | * | 10/1991 | Ogita | F02M 25/089 123/568.21 |
| 5,142,866 A | * | 9/1992 | Yanagihara | F02B 37/16 60/605.2 |
| 5,188,087 A | * | 2/1993 | Saito | F02D 19/087 123/568.21 |
| 5,960,769 A | * | 10/1999 | Mashiki | F02B 31/085 123/308 |
| 6,345,603 B1 | * | 2/2002 | Abboud | F02D 11/107 123/397 |
| 6,948,475 B1 | * | 9/2005 | Wong | F02M 26/19 123/299 |
| 9,151,233 B2 | | 10/2015 | Sasaki et al. | |
| 9,243,590 B2 | | 1/2016 | Fukuda et al. | |
| 2002/0100454 A1 | * | 8/2002 | Itoyama | F02D 41/1497 123/350 |
| 2002/0124832 A1 | * | 9/2002 | Oota | F02D 21/08 123/480 |
| 2007/0119172 A1 | * | 5/2007 | Barbe | F02M 26/05 60/605.2 |
| 2010/0206274 A1 | * | 8/2010 | Furukawa | F02M 26/10 123/568.11 |
| 2014/0261312 A1 | * | 9/2014 | Ueno | F02D 9/02 123/337 |
| 2015/0354483 A1 | * | 12/2015 | Brewbaker | F02M 26/06 60/605.2 |

FOREIGN PATENT DOCUMENTS

| | | | | |
|---|---|---|---|---|
| JP | 6-117280 A | | 4/1994 | |
| JP | 10047120 A | * | 2/1998 | |
| JP | 2001-193538 A | | 7/2001 | |
| JP | 2010031685 A | * | 2/2010 | |
| JP | 2010-138734 A | | 6/2010 | |
| JP | 2016-56802 A | | 4/2016 | |
| WO | WO-2009046292 A2 | * | 4/2009 | ............ F02B 37/22 |

* cited by examiner

CONTROL METHOD AND CONTROL DEVICE FOR INTERNAL COMBUSTION ENGINE

TECHNICAL FIELD

The present invention relates to internal combustion engine control.

BACKGROUND ART

As an automotive internal combustion engine, especially, as an automotive gasoline internal combustion engine, a downsized and turbocharged internal combustion engine is recently becoming mainstream, in which provision of a supercharger allows a reduction of displacement, and thereby achieves an enhancement in fuel efficiency in balance with power. For such an internal combustion engine, an art is known which uses an EGR device for recirculating an EGR gas as a part of exhaust gas to an intake passage, to achieve an improvement in pumping loss, and an improvement in knocking in a high load region, and thereby an improvement in fuel efficiency. In recent years, it is in increasing technical demand to enhance an EGR rate (a ratio of a quantity of EGR gas with respect to a quantity of fresh air) for improvement in fuel efficiency, and maintain the EGR rate high in a wide region of operation of the engine (in terms of engine rotational speed and engine load).

A patent document 1 discloses an art for suppression of combustion noise of an in-cylinder fuel injection diesel engine at idle, wherein an intake throttle valve is disposed in an intake passage, and with the engine at idle, is controlled to be closed for a reduction in intake quantity, to set an in-cylinder air fuel ratio smaller than a theoretical air fuel ratio, and thereby suppress combustion noise.

PRIOR ART DOCUMENT(S)

Patent Document(s)

Patent Document 1: Japanese Patent Application Publication No. 2001-193538

SUMMARY OF INVENTION

Problem(s) to be Solved by Invention

The invention described in patent document 1 is an art specialized for a diesel engine whose output torque is controlled through a fuel injection quantity, and is not suitable for a spark-ignition gasoline internal combustion engine whose output torque is controlled through an intake air quantity.

An operation region where EGR is performed can be expanded by: providing a negative pressure control valve in a part of an intake passage upstream of a confluence of an EGR passage and the intake passage; and also in a low load state, controlling the negative pressure control valve in a closing direction so as to ensure a differential pressure between an exhaust passage and the intake passage, and thereby allow an EGR gas to be sucked into the intake passage.

It is an object of the present invention to employ such a negative pressure control valve for effectively suppressing occurrence of combustion noise when in an operation region lower in load than the operation region where EGR is performed.

Means for Solving Problem(s)

According to one aspect of the present invention, an internal combustion engine control method for an internal combustion engine, the internal combustion engine including: an EGR passage connecting an exhaust passage to an intake passage for recirculating an EGR gas to the intake passage, wherein the EGR gas is a part of exhaust gas; and a negative pressure control valve disposed in a part of the intake passage upstream of a confluence of the EGR passage and the intake passage, and configured to open and close the intake passage; the internal combustion engine control method comprises: controlling the negative pressure control valve in a manner to ensure a differential pressure between the exhaust passage and the intake passage, when a state of operation of the internal combustion engine is in an EGR region where the EGR gas is recirculated to the intake passage through the EGR passage; and controlling the negative pressure control valve in a closing direction, and controlling an opening of the negative pressure control valve in a manner that a quantity of air passing through the negative pressure control valve is greater than or equal to a target intake air quantity, when the state of operation of the internal combustion engine is in an operation region lower in load than the EGR region, wherein the target intake air quantity is set based on the state of operation of the internal combustion engine. According to another aspect of the present invention, an internal combustion engine control device comprises: an EGR passage connecting an exhaust passage to an intake passage for recirculating an EGR gas to the intake passage, wherein the EGR gas is a part of exhaust gas; a negative pressure control valve disposed in a part of the intake passage upstream of a confluence of the EGR passage and the intake passage, and configured to open and close the intake passage; and a control section configured to control operation of the negative pressure control valve, wherein the control section is further configured to: control the negative pressure control valve in a manner to ensure a differential pressure between the exhaust passage and the intake passage, when in an EGR region where the EGR gas is recirculated to the intake passage through the EGR passage; and control the negative pressure control valve in a closing direction, and control an opening of the negative pressure control valve in a manner that a quantity of air passing through the negative pressure control valve is greater than or equal to a target intake air quantity, when in an operation region lower in load than the EGR region, wherein the target intake air quantity is set based on a state of operation of an internal combustion engine.

Effect(s) of Invention

According to the present invention, it is possible to suppress occurrence of noise and enhance quietness by effectively employing the negative pressure control valve, when in an operation region lower in load than the EGR region, wherein the negative pressure control valve is provided for ensuring the differential pressure when in the EGR region.

MODE(S) FOR CARRYING OUT INVENTION

Figure 1:
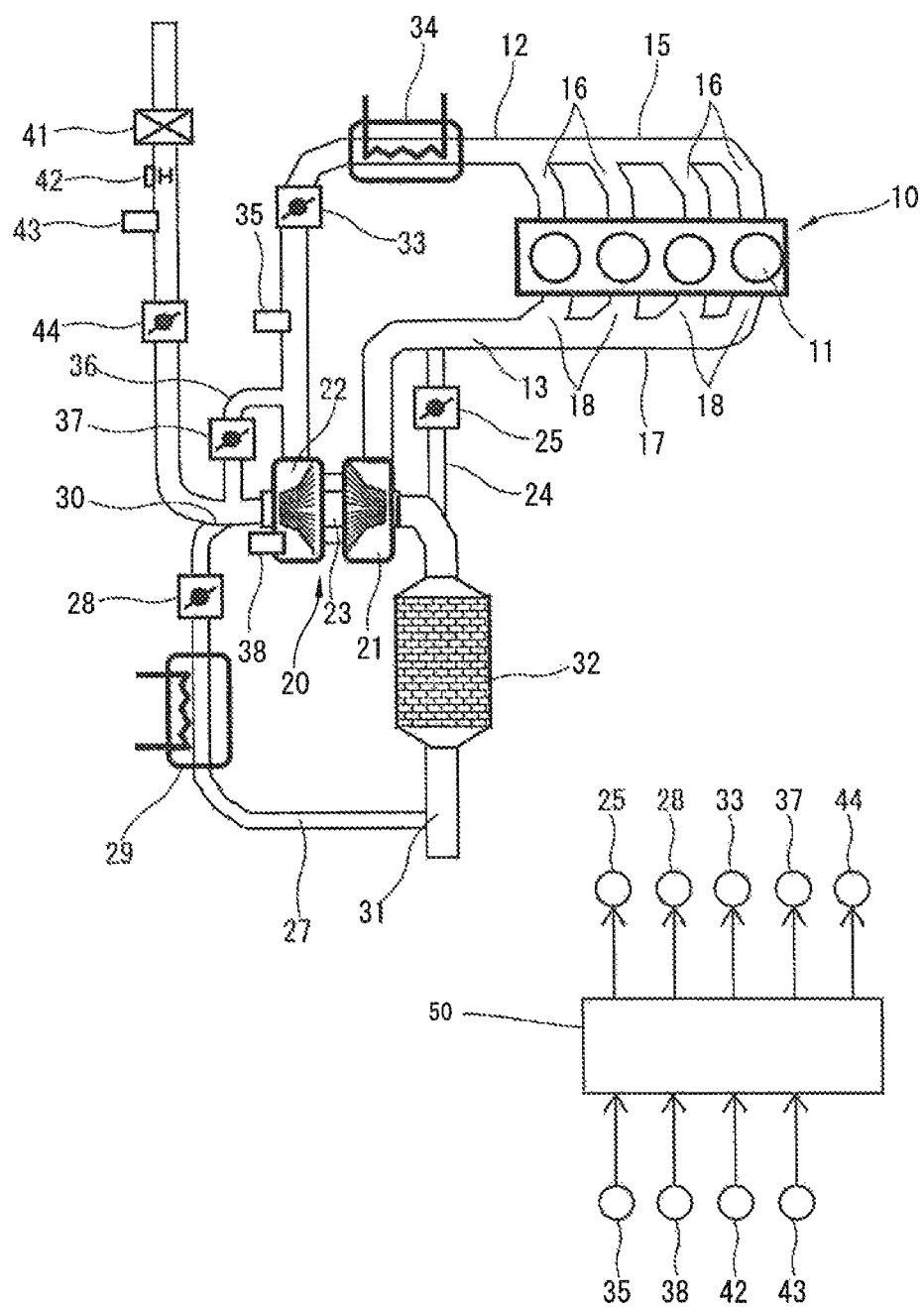
FIG. 1 is a configuration diagram schematically showing system configuration of an internal combustion engine to which a control method and a control device according to an embodiment of the present invention are applied.

The following describes the present invention with reference to an embodiment shown in the drawings. FIG. 1 schematically shows system configuration of an internal combustion engine to which a control method and a control device according to a first embodiment of the present invention are applied.

An internal combustion engine 10 is a straight four-cylinder spark-ignition gasoline internal combustion engine, wherein each cylinder includes a combustion chamber 11 connected to an intake passage 12 and an exhaust passage 13. Intake passage 12 is connected to an intake port of each cylinder through a corresponding one of four intake branch passages 16 of an intake manifold 15. Exhaust passage 13 is connected to an exhaust port of each cylinder through a corresponding one of four exhaust branch passages 18 of an exhaust manifold 17.

Internal combustion engine 10 is provided with a supercharger 20 of a turbo type. Supercharger 20 includes a turbine 21 and a compressor 22, wherein turbine 21 is disposed in exhaust passage 13, and compressor 22 is disposed in intake passage 12, and turbine 21 and compressor 22 are coaxially arranged on a single shaft 23 where a back side of turbine 21 faces a back side of compressor 22. An energy of exhaust gas causes turbine 21 to drive the compressor 22 rotationally for supercharging. Exhaust passage 13 is provided with a bypass passage 24 that bypasses turbine 21. Bypass passage 24 is provided with a wastegate valve 25 for regulation of boost pressure.

Moreover, internal combustion engine 10 is provided with an external EGR device for recirculating an EGR gas to intake passage 12, wherein the EGR gas is a part of exhaust gas. The external EGR device includes: an EGR passage 27 connecting the exhaust passage 13 to intake passage 12; an EGR control valve 28 disposed in EGR passage 27, and configured to open and close the EGR passage 27 and thereby control an EGR rate and a flow rate of the EGR gas, wherein the EGR rate is a ratio of EGR gas with respect to fresh air; and an EGR cooler 29 configured to cool the EGR gas flowing in EGR passage 27.

The external EGR device is a so-called low-pressure type EGR device where a confluence 30 is arranged upstream of compressor 22, wherein confluence 30 is an EGR introduction opening where EGR passage 27 is connected to intake passage 12. An EGR takeout opening 31, where EGR passage 27 is connected to exhaust passage 13, is arranged downstream of a catalyst 32 such as a three-way catalyst, wherein catalyst 32 is disposed downstream of turbine 21.

Intake passage 12 is provided with an intake air quantity regulation valve (so-called throttle valve) 33 and an intercooler 34 downstream of compressor 22, wherein intake air quantity regulation valve 33 is of an electronically controlled type, and is configured to regulate a quantity of intake air, and intercooler 34 is configured to cool intake air. Intake passage 12 is further provided with a boost pressure sensor 35 upstream of intake air quantity regulation valve 33, wherein boost pressure sensor 35 is configured to sense a boost pressure.

For relief of a pressure occurring at compressor 22 at deceleration or the like, a recirculation passage 36 is provided to connect a part of intake passage 12 upstream of compressor 22 to a part of intake passage 12 downstream of compressor 22. Recirculation passage 36 is provided with a recirculation valve 37 for regulating the flow rate of intake air passing through the recirculation passage 36. Compressor 22 is provided with a turbo speed sensor 38 for sensing a turbo rotational speed (turbo speed).

The part of intake passage 12 upstream of confluence 30 of EGR passage 27 is provided with an air cleaner 41, an airflow meter 42, an atmospheric pressure sensor 43, and a negative pressure control valve 44, which are arranged in this order from an upstream side, wherein air cleaner 41 is configured to remove foreign matter in intake air, and airflow meter 42 is configured to sense the intake air quantity, and atmospheric pressure sensor 43 is configured to sense the atmospheric pressure.

Negative pressure control valve 44 has a basic function such that when in an EGR region "Regr", the opening of negative pressure control valve 44 is controlled to generate a negative pressure in a part of intake passage 12 downstream of negative pressure control valve 44, wherein the part includes confluence 30 to which EGR passage 27 is connected, and thereby ensure a differential pressure between exhaust passage 13 and intake passage 12, and thereby ensure stability of introduction of the EGR gas, while suppressing effects of exhaust pulsation.

A control section 50 is configured to memorize and perform various controls. Based on sensing signals from various sensors for sensing a state of operation of the engine, namely, boost pressure sensor 35, airflow meter 42, atmospheric pressure sensor 43, turbo speed sensor 38, etc., control section 50 outputs control signals to wastegate valve 25, EGR control valve 28, intake air quantity regulation valve 33, recirculation valve 37, negative pressure control valve 44, etc., to control their operations.

Figure 2:
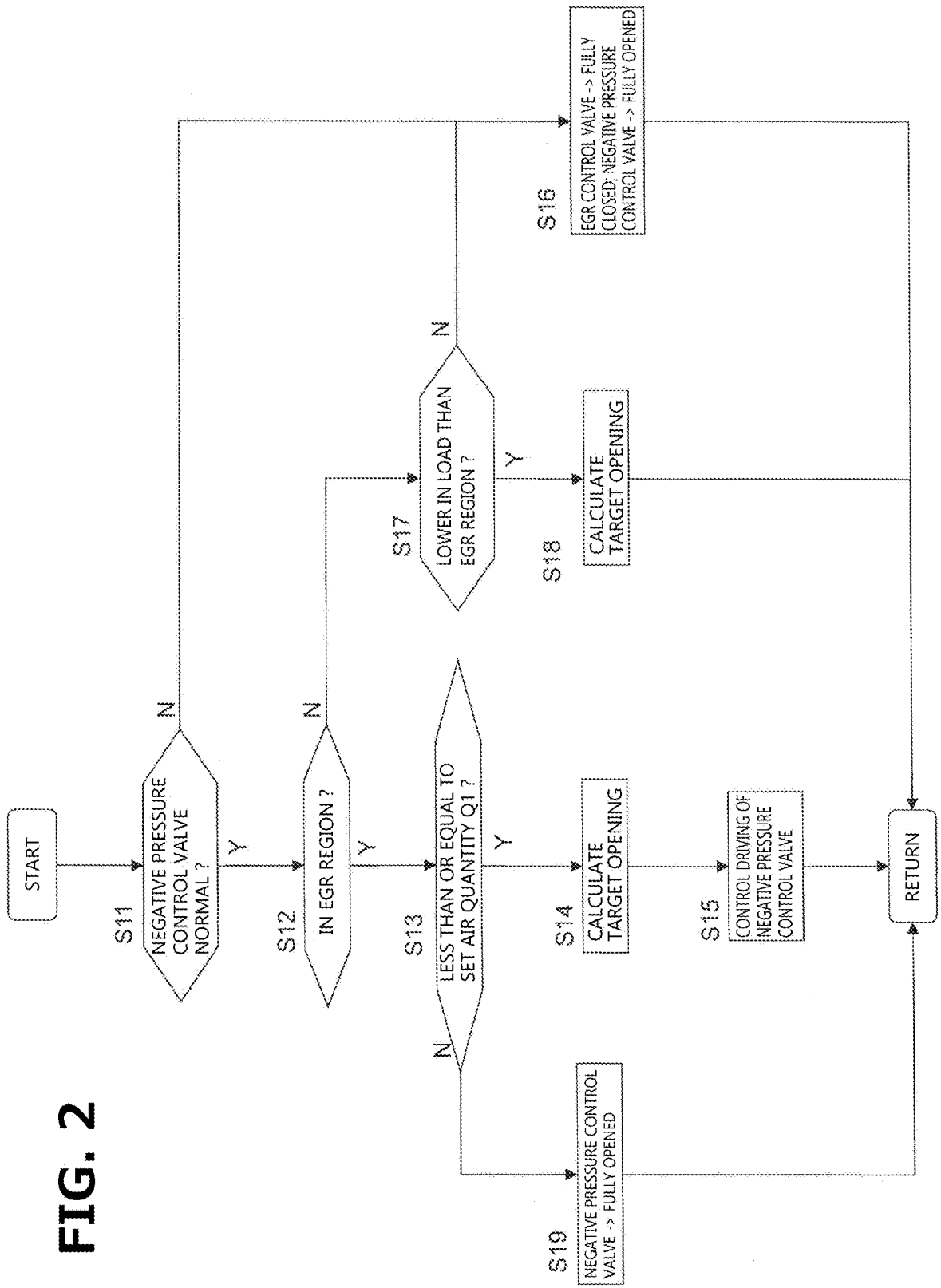
FIG. 2 is a flow chart showing a flow of control according to the present embodiment.

FIG. 2 is a flow chart showing a flow of control for negative pressure control valve 44. This routine is executed repeatedly by control section 50 at intervals of a predetermined time period (10 ms, for example).

Figure 3:
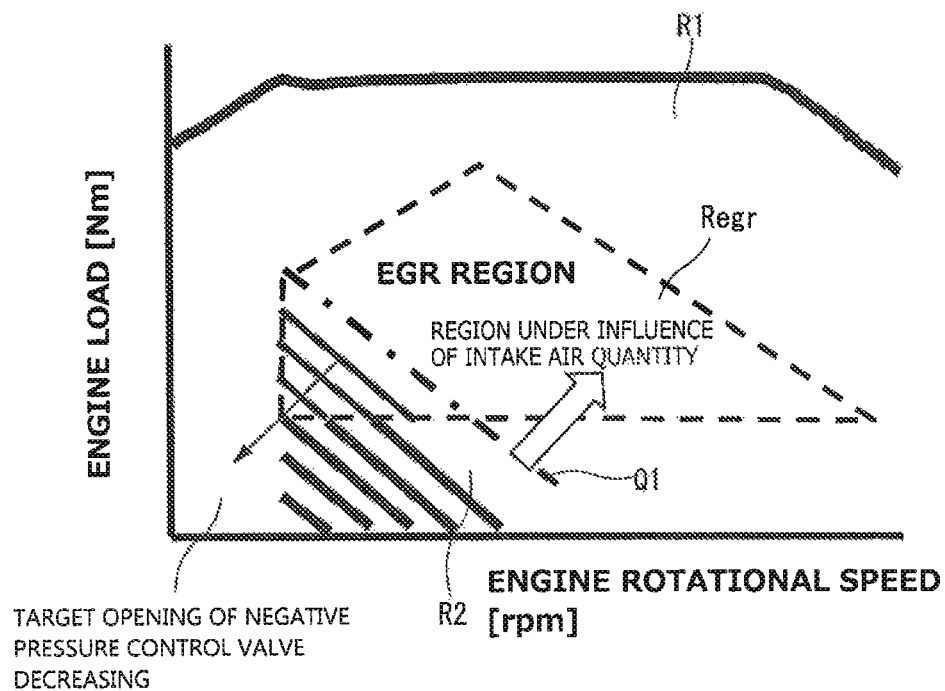
FIG. 3 is a characteristic diagram showing a map for setting an EGR region.

At Step S11, control section 50 determines whether or not negative pressure control valve 44 is normal. When determining that negative pressure control valve 44 is normal, control section 50 proceeds to Step S12. At Step S12, control section 50 determines whether or not internal combustion engine 10 is in the predetermined EGR region Regr where so-called EGR operation is performed to recirculate the EGR gas to intake passage 12 through the EGR passage 27, by using an EGR map as shown in FIG. 3, based on the engine speed and engine load which represent a state of operation of internal combustion engine 10. The EGR region Regr is set as a relatively wide region of middle speed and middle load, as shown in FIG. 3. In FIG. 3, solid lines and a long dashed short dashed line, which extend downward to the right, are air quantity contour lines, each of which is formed by connecting operating points identical in intake air quantity.

Figure 4:
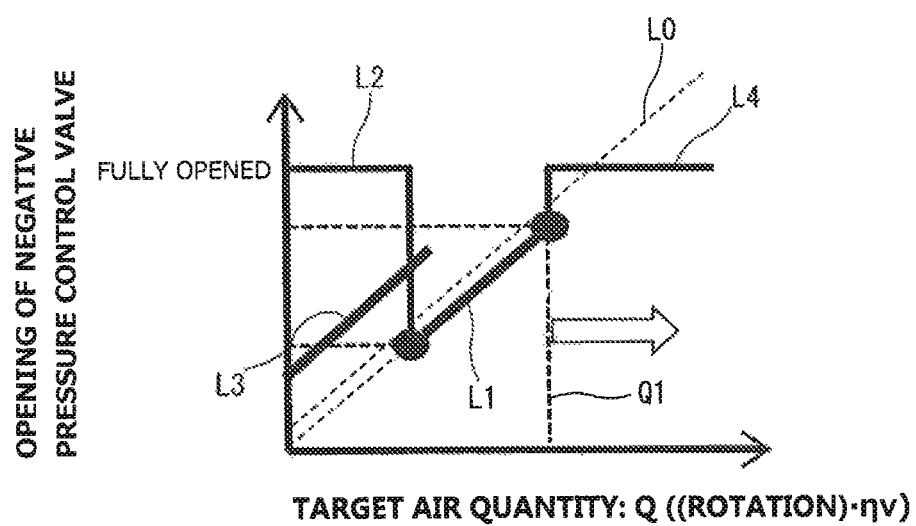
FIG. 4 is an illustrative diagram showing operation of a negative pressure control valve.

When in the EGR region Regr, control section 50 proceeds to Step S13. At Step S13, control section 50 determines whether or not a target intake air quantity is less than or equal to a predetermined set air quantity Q1, wherein the target intake air quantity is determined depending on the state of operation of the engine. The set air quantity Q1 is predetermined to correspond to a limit value of the target intake air quantity that cannot be achieved when negative pressure control valve 44 is controlled in the closing direction, as shown in FIG. 3. Namely, in the region where the target intake air quantity is greater than the set air quantity Q1, it is required to set the negative pressure control valve 44 fully opened, for ensuring a sufficient intake air quantity. When the target intake air quantity is less than or equal to the set air quantity Q1 (in the region on the left and lower side of the long dashed short dashed line representing the set air quantity Q1 in FIG. 3), control section 50 proceeds to Step S14. At Step S14, control section 50 calculates the target opening of negative pressure control valve 44 for obtaining a predetermined differential pressure between exhaust passage 13 and intake passage 12 depending on the target flow rate of the EGR gas. The target opening of negative pressure control valve 44 is set to change in the closing direction, namely, decrease, as the engine speed and engine load decrease, namely, as the target air quantity decreases, as shown in FIGS. 3 and 4. At Step S15, control section 50 controls driving of negative pressure control valve 44, based on the target opening set at Step S14.

When determining at Step S11 that negative pressure control valve 44 is not normal, control section 50 proceeds to Step S16. At Step S16, control section 50 performs a failsafe control to inhibit operation of EGR control valve 28, namely, cause the EGR control valve 28 to be fully closed, for preventing the EGR gas from recirculating to intake passage 12. Moreover, negative pressure control valve 44 is fully opened, which is an initial setting. In summary, EGR control valve 28 is fully closed, and negative pressure control valve 44 is fully opened.

When determining at Step S12 that it is not in the EGR region Regr, control section 50 proceeds to Step S17. At Step S17, control section 50 determines whether or not it is in an operation region R2 lower in load than the EGR region Regr. When determining that it is in the operation region R2 lower in load than the EGR region Regr, control section 50 proceeds to Step S18. At Step S18, control section 50 sets the target opening of negative pressure control valve 44 so as to cause negative pressure control valve 44 to shift in the closing direction. Namely, as shown in FIG. 3, negative pressure control valve 44 is controlled in the closing direction, although it is in the non-EGR region R2 lower in load than the EGR region Regr. For this control, the target opening of negative pressure control valve 44 is basically set to change in the closing direction, namely, decrease, as the engine speed and engine load decrease, as shown in FIG. 3 and detailed below with reference to FIG. 4.

In this way, also when in the non-EGR region R2 lower in load than the EGR region Regr, the control of negative pressure control valve 44 in the closing direction serves to generate a negative pressure in the part of intake passage 12 downstream of negative pressure control valve 44, and thereby suppress combustion noise from the intake side, and suppress an airflow sound occurring from supercharger 20 at acceleration or deceleration. The suppression of the airflow sound makes it possible to downsize or reduce components for countermeasures against sound and vibration.

For this control, the target opening of negative pressure control valve 44 is set such that the opening area of negative pressure control valve 44 is greater than or equal to the opening area (opening) of intake air quantity regulation valve 33 that is set based on the state of operation of the engine. This serves to suppress the intake air quantity from decreasing, and suppress the pumping loss from being adversely affected, although negative pressure control valve 44 is controlled in the closing direction.

When determining at Step S17 that it is in an operation region R1 higher in load than the EGR region Regr, control section 50 proceeds to Step S16. At Step S16, control section 50 inhibits operation of EGR control valve 28, namely, causes EGR control valve 28 to be fully closed, for preventing the EGR gas from recirculating to intake passage 12. Furthermore, negative pressure control valve 44 is fully opened, which is an initial setting. In summary, EGR control valve 28 is fully closed, and negative pressure control valve 44 is fully opened.

When determining at Step S13 that the target intake air quantity is greater than the set air quantity Q1, control section 50 proceeds to Step S19. At Step S19, control section 50 stops operation of negative pressure control valve 44, namely, causes negative pressure control valve 44 to be fully opened. Since it is in the EGR region Regr, EGR control valve 28 is controlled in the opening direction so as to achieve the target EGR rate.

Referring to FIG. 4, a reference sign Q1 represents a line where the target intake air quantity is equal to the set air quantity Q1 as shown in FIG. 3, whereas a reference line L0 represents a line where the opening area of negative pressure control valve 44 is equal to the opening area of intake air quantity regulation valve 33. Accordingly, in the region on the right and lower side of the line L0, the negative pressure of the downstream side of negative pressure control valve 44 is greater in absolute value than the negative pressure of intake air quantity regulation valve 33.

In FIG. 4, a solid line L1 represents a characteristic of the opening of negative pressure control valve 44 when the state of operation of internal combustion engine 10 is in a part of the EGR region Regr where target air quantity Q is not greater than the set air quantity Q1. In such a state of operation, the target opening of negative pressure control valve 44 is controlled in the closing direction for ensuring a differential pressure between exhaust passage 13 and intake passage 12. Specifically, as indicated by the solid line L1, for ensuring the predetermined differential pressure while minimizing the pumping loss, the target opening of negative pressure control valve 44 is set such that the target opening varies in the closing direction (the opening becomes small) as the target air quantity decreases, along the line L1 having a slight offset from the line L0 in the closing direction, wherein on the line L0, the opening area of negative pressure control valve 44 is equal to the opening area of intake air quantity regulation valve 33.

In FIG. 4, a solid line L2 represents a characteristic of a comparative example to which the control according to the present embodiment is not applied, where negative pressure control valve 44 is fully opened in the region lower in load than the EGR region Regr. On the other hand, in FIG. 4, a solid line L3 represents a characteristic for the case where the control according to the present embodiment is adopted, and negative pressure control valve 44 is controlled in the closing direction when in the region lower in load than the EGR region Regr. As shown in FIG. 4, for this control, the target opening of negative pressure control valve 44 is set such that the target opening varies in the closing direction as the target air quantity decreases, in an area having an offset from of the line L0 in the opening direction, in order to reliably prevent the pumping loss from being adversely affected, because it is not required to ensure a differential pressure for stability of introduction of the EGR gas. Namely, as compared to the EGR region Regr, when in the region R2 lower in load than the EGR region Regr, the target opening is set with an offset in the opening direction, with respect to the same target air quantity Q (as long as the target air quantity Q does not exceed the set air quantity Q1). This serves to set the quantity of air, which passes through the negative pressure control valve 44, greater than or equal to the target intake air quantity that is set based on the state of operation of the internal combustion engine. On the other hand, when Q is greater than the set air quantity Q1, negative pressure control valve 44 is fully opened to ensure a sufficient intake air quantity. The control according to the present embodiment (the characteristic represented by the solid line L3) is applicable to a range of the target air quantity Q not greater than the set air quantity Q1, wherein the maximum value of the target air quantity Q (the right end of the solid line L3 in FIG. 4) may be adjusted within the range not greater than the set air quantity Q1, in consideration of a requirement about combustion noise of internal combustion engine 10, a requirement about quietness of the vehicle where internal combustion engine 10 is mounted, etc.

When in the operation region R1 higher in load than the EGR region Regr, negative pressure control valve 44 is fully opened as indicated by a solid line L4 in FIG. 4.

<1> As described above, in the present embodiment, when in the EGR region Regr, negative pressure control valve 44 is controlled to ensure a differential pressure between exhaust passage 13 and intake passage 12. When in the operation region R2 lower in load than the EGR region Regr, negative pressure control valve 44 is controlled in the closing direction, to generate a negative pressure at the downstream side of negative pressure control valve 44, and thereby suppress the in-cylinder pressure from rising, and thereby reduce combustion noise of the internal combustion engine, and also reduce the airflow sound caused by supercharger 20, and noise caused by passing through recirculation valve 37, and further downsize or reduce components for countermeasures against sound and vibration. This suppression of noise in the lower load operation region serves to enhance the quietness effectively, because in the lower load operation region, the engine speed and vehicle speed are relatively low so that combustion noise of the internal combustion engine and noise by vehicle running are small and even a relatively small noise is therefore annoying.

Moreover, for example, when the state of operation shifts from the EGR region Regr to the lower-load side operation region R2, negative pressure control valve 44 continues to be controlled in the closing direction as in the EGR region Regr. This serves to suppress the tonal quality from being changed by rapid operation of negative pressure control valve 44 in the opening direction from the closed state.

<2> Furthermore, the target opening of negative pressure control valve 44 is controlled such that the quantity of air passing through negative pressure control valve 44 is greater than or equal to the target intake air quantity when in the operation region R2 lower in load than the EGR region Regr, wherein the target intake air quantity is set based on the state of operation of the engine. This serves to prevent the intake air quantity from becoming small with respect to the target intake air quantity, although negative pressure control valve 44 is controlled in the closing direction.

<3> As shown in FIG. 4, when in the operation region R2 lower in load than the EGR region Regr, the target opening (L3) of negative pressure control valve 44 is set with an offset in the opening direction from the line L0 with which the opening area of negative pressure control valve 44 is equal to the opening area of intake air quantity regulation valve 33, namely, the opening area of negative pressure control valve 44 is set greater than or equal to the opening area of intake air quantity regulation valve 33. This serves to prevent the negative pressure at the downstream side of negative pressure control valve 44 from increasing excessively, and thereby prevent the pumping loss from being adversely affected.

<4> The feature that negative pressure control valve 44 is disposed downstream of airflow meter 42, serves to suppress the airflow meter 42 from being made dirty and damaged by backflow of intake air when negative pressure control valve 44 is controlled in the closing direction.

<5> Compressor 22 of turbo-type supercharger 20, and the place where recirculation passage 36 is connected to intake passage 12, are arranged in a part of intake passage 12 downstream of confluence 30 of EGR passage 27. Accordingly, when recirculation valve 37 opens at deceleration, it allows backflow of the EGR gas. However, even in this situation, the feature that negative pressure control valve 44 is disposed downstream of airflow meter 42, serves to suppress the airflow meter 42 from being made dirty and damaged, as described above.

Although the present invention has been described above with reference to the specific embodiment, the present invention is not limited to the embodiment, but includes various variations and modifications. For example, the present invention may be applied to an internal combustion engine that is not provided with supercharger 20 of the turbo type.

The invention claimed is:

1. An internal combustion engine control method for an internal combustion engine, the internal combustion engine including:
an EGR passage connecting an exhaust passage to an intake passage for recirculating an EGR gas to the intake passage, wherein the EGR gas is a part of exhaust gas;
a negative pressure control valve disposed in a part of the intake passage upstream of a confluence of the EGR passage and the intake passage, and configured to open and close the intake passage; and
an intake air quantity regulation valve disposed in a part of the intake passage downstream of the confluence;

the internal combustion engine control method comprising:
setting a target intake air quantity of the internal combustion engine based on a state of operation of the internal combustion engine;
controlling the negative pressure control valve in a manner to ensure a differential pressure between the exhaust passage and the intake passage, in response to a condition that the state of operation of the internal combustion engine is in an EGR region where the EGR gas is recirculated to the intake passage through the EGR passage; and
controlling an opening of the intake air quantity regulation valve in accordance with the target intake air quantity, controlling the negative pressure control valve in a closing direction, and controlling an opening of the negative pressure control valve in a manner that an opening area of the negative pressure control valve is greater than an opening area of the intake air quantity regulation valve, in response to a condition that the state of operation of the internal combustion engine is in an operation region lower in load than the EGR region.

2. The internal combustion engine control method as claimed in claim 1, wherein:

the internal combustion engine further includes an airflow meter for sensing a quantity of intake air flowing in the intake passage; and the negative pressure control valve is disposed downstream of the airflow meter.

3. The internal combustion engine control method as claimed in claim 1, wherein:
the internal combustion engine further includes:
a compressor of a supercharger for supercharging intake air;
a recirculation passage bypassing the compressor, and connecting a part of the intake passage upstream of the compressor to a part of the intake passage downstream of the compressor; and
a recirculation valve disposed in the recirculation passage; and
the compressor is disposed in a part of the intake passage downstream of the confluence.

4. The internal combustion engine control method as claimed in claim 2, wherein:
the internal combustion engine further includes:
a compressor of a supercharger for supercharging intake air;
a recirculation passage bypassing the compressor, and connecting a part of the intake passage upstream of the compressor to a part of the intake passage downstream of the compressor; and
a recirculation valve disposed in the recirculation passage; and
the compressor is disposed in a part of the intake passage downstream of the confluence.

5. The internal combustion engine control method as claimed in claim 1, further comprising:
calculating a target opening of the negative pressure control valve so as to ensure the differential pressure depending on a target flow rate of the EGR gas, and controlling the negative pressure control valve in accordance with the target opening, in response to a condition that the target intake air quantity is less than or equal to a set air quantity and the state of operation of the internal combustion engine is in the EGR region; and
fully opening the negative pressure control valve, in response to a condition that the target intake air quantity is greater than the set air quantity and the state of operation of the internal combustion engine is in the EGR region.

6. An internal combustion engine control device for an internal combustion engine,
the internal combustion engine comprising:
an EGR passage connecting an exhaust passage to an intake passage for recirculating an EGR gas to the intake passage, wherein the EGR gas is a part of exhaust gas;
a negative pressure control valve disposed in a part of the intake passage upstream of a confluence of the EGR passage and the intake passage, and configured to open and close the intake passage; and
an intake air quantity regulation valve disposed in a part of the intake passage downstream of the confluence;
the internal combustion engine control device comprising a controller configured to control operation of the negative pressure control valve, wherein the controller is further configured to:

set a target intake air quantity of the internal combustion engine based on a state of operation of the internal combustion engine;
control the negative pressure control valve in a manner to ensure a differential pressure between the exhaust passage and the intake passage, in response to a condition that the state of operation of the internal combustion engine is in an EGR region where the EGR gas is recirculated to the intake passage through the EGR passage; and
control an opening of the intake air quantity regulation valve in accordance with the target intake air quantity, control the negative pressure control valve in a closing direction, and control an opening of the negative pressure control valve in a manner that an opening area of the negative pressure control valve is greater than an opening area of the intake air quantity regulation valve, in response to a condition that the state of operation of the internal combustion engine is in an operation region lower in load than the EGR region.

7. The internal combustion engine control device as claimed in claim 6, wherein:
the internal combustion engine further includes an airflow meter for sensing a quantity of intake air flowing in the intake passage; and
the negative pressure control valve is disposed downstream of the airflow meter.

8. The internal combustion engine control device as claimed in claim 6, wherein:
the internal combustion engine further includes:
a compressor of a supercharger for supercharging intake air;
a recirculation passage bypassing the compressor, and connecting a part of the intake passage upstream of the compressor to a part of the intake passage downstream of the compressor; and
a recirculation valve disposed in the recirculation passage; and
the compressor is disposed in a part of the intake passage downstream of the confluence.

9. The internal combustion engine control device as claimed in claim 7, wherein:
the internal combustion engine further includes:
a compressor of a supercharger for supercharging intake air;
a recirculation passage bypassing the compressor, and connecting a part of the intake passage upstream of the compressor to a part of the intake passage downstream of the compressor; and
a recirculation valve disposed in the recirculation passage; and
the compressor is disposed in a part of the intake passage downstream of the confluence.

10. The internal combustion engine control device as claimed in claim 6, wherein the controller is further configured to:
calculate a target opening of the negative pressure control valve so as to ensure the differential pressure depending on a target flow rate of the EGR gas, and control the negative pressure control valve in accordance with the target opening, in response to a condition that the target intake air quantity is less than or equal to a set air quantity and the state of operation of the internal combustion engine is in the EGR region; and
fully open the negative pressure control valve, in response to a condition that the target intake air quantity is greater than the set air quantity and the state of operation of the internal combustion engine is in the EGR region.

* * * * *